US012288438B2

(12) United States Patent
Daumann et al.

(10) Patent No.: US 12,288,438 B2
(45) Date of Patent: Apr. 29, 2025

(54) PROCEDURE FOR DETERMINING THE AUTHENTICITY OF AN OBJECT

(71) Applicants: LEUCHTSTOFFWERK BREITUNGEN GMBH, Breitungen (DE); SENSOR-INSTRUMENTS ENTWICKLUNGS- UND VERTRIEBS-GMBH, Thurmansbang (DE)

(72) Inventors: Benedikt Daumann, Wallersdorf (DE); Thomas Kaib, Eisenach (DE); Thomas Bitzer, Mönchengladbach (DE); Dominik Uhlich, Bad Liebenstein (DE); Walter Braumandl, Thurmansbang (DE)

(73) Assignees: SENSOR-INSTRUMENTS ENTWICKLUNGS- UND VERTRIBES-GMBH, Thurmansbang (DE); LEUCHTSTOFFWERK BREITUNGEN GMBH, Breitungen (DE)

( * ) Notice: Subject to any disclaimer, the term of this patent is extended or adjusted under 35 U.S.C. 154(b) by 0 days.

(21) Appl. No.: 18/682,583

(22) PCT Filed: Jul. 26, 2022

(86) PCT No.: PCT/IB2022/056898

§ 371 (c)(1),
(2) Date: Feb. 9, 2024

(87) PCT Pub. No.: WO2023/017347

PCT Pub. Date: Feb. 16, 2023

(65) Prior Publication Data

US 2024/0331480 A1 Oct. 3, 2024

(30) Foreign Application Priority Data

Aug. 12, 2021 (DE) ........................ 102021120981.1

(51) Int. Cl.
*G07D 7/1205* (2016.01)

(52) U.S. Cl.
CPC .................................. *G07D 7/1205* (2017.05)

(58) Field of Classification Search
CPC .... G07D 7/1205; G07D 7/12; G07D 2207/00; G07D 7/003; G07D 7/06; G07D 7/205;
(Continued)

(56) References Cited

U.S. PATENT DOCUMENTS 4,058,732 A * 11/1977 Wieder .............. G01N 21/6428
250/461.1
5,485,530 A * 1/1996 Lakowicz .............. G01K 11/20
382/133

(Continued)

FOREIGN PATENT DOCUMENTS

| | | | |
|---|---|---|---|
| DE | 102004016249 | A1 | 10/2005 |
| DE | 102017130027 | A1 | 6/2019 |
| EP | 2449055 | B1 | 6/2017 |

OTHER PUBLICATIONS

International Search Report for corresponding International Patent Application No. PCT/IB2022/056898 dated Nov. 21, 2022.

*Primary Examiner* — Mohamed K Amara
(74) *Attorney, Agent, or Firm* — Greer, Burns & Crain, Ltd.

(57) ABSTRACT

A method for determining the authenticity of an object by marking the object with a first luminescent material with a first decay behavior over time, marking the object with a second luminescent material with a second decay behavior that differs from the first decay behavior, excitation of the luminescent materials with a light pulse, measuring the afterglow intensities of both luminescent materials temporally after the excitation with the light pulse, forming a difference signal or identity signal from the afterglow intensities measured over the elapsed time, determining the time
(Continued)

of a zero crossing of the difference signal or the time of the identity signal of a comparator, comparing the time determined by the zero crossing or by the identity signal with a setpoint value.

12 Claims, 4 Drawing Sheets

(58) Field of Classification Search
CPC ..... G07D 7/206; B41M 3/144; B42D 25/378; B42D 25/382; B42D 25/387; B42D 25/405; G01N 21/6408; G01N 21/6456
See application file for complete search history.

(56) References Cited

U.S. PATENT DOCUMENTS 6,741,336 B2 * 5/2004 Ahlers .................. G07D 7/121 250/271
10,457,087 B2 10/2019 Dorier et al.
10,900,898 B2 1/2021 Reinhardt et al.
2004/0166508 A1 * 8/2004 Pawlak ................ G01N 21/553 436/514
2004/0220298 A1 * 11/2004 Kozee .................... B41M 3/144 106/31.86
2005/0059014 A1 * 3/2005 Pawlak ............ G01N 33/54353 506/14
2006/0180792 A1 * 8/2006 Ricci ........................ G07C 9/20 252/301.36
2008/0048106 A1 * 2/2008 Blanchard .............. G07D 7/121 250/363.01
2008/0174766 A1 * 7/2008 Haaslahti ............. G01N 33/542 356/73
2012/0138856 A1 6/2012 Haubrich et al.
2012/0164681 A1 * 6/2012 Reinisch ............ G01N 21/6486 435/288.7
2013/0256564 A1 * 10/2013 Hell ....................... G01N 21/64 250/459.1
2015/0204847 A1 * 7/2015 Thomas ............. G01N 21/6408 435/29
2015/0293021 A1 * 10/2015 Finkelstein .......... C12Q 1/6869 506/13
2016/0245750 A1 * 8/2016 Jiang .................. G01N 21/6428
2016/0258881 A1 * 9/2016 Bown ................ G01N 21/8806
2019/0162864 A1 5/2019 Menge
2021/0117632 A1 * 4/2021 Braumandl .............. G06K 1/00
2021/0120193 A1 * 4/2021 Swager ............ G01N 33/54386
2023/0366026 A1 * 11/2023 Rothberg ........... G01N 21/6452

* cited by examiner

PROCEDURE FOR DETERMINING THE AUTHENTICITY OF AN OBJECT

CROSS-REFERENCES TO RELATED APPLICATIONS

This application is a national phase of International Patent Application No. PCT/IB2022/056898, filed on Jul. 26, 2022, which claims the benefit of German Patent Application No. 10 2021 120 981.1, filed on Aug. 12, 2021, the entire disclosures of which are incorporated herein by way of reference.

FIELD OF THE INVENTION

The invention relates to a method for determining the authenticity of an object, comprising the following method steps: marking the object with a first luminescent material with a first temporal decay behavior, marking the object with a second luminescent material with a second decay behavior which differs from the first decay behavior, exciting the luminescent materials with a light pulse, measuring the afterglow intensities of both luminescent materials temporally after the excitation with the light pulse.

BACKGROUND OF THE INVENTION

For the forgery-proof marking of objects with an authenticity feature, it is known to use luminescent materials after excitation and to numerically characterize their decay time by time-resolved spectral measurement. The production of a luminescent material with a specific, characteristic afterglow time alone makes it economically unattractive for a counterfeiter to synthesize the authenticity feature, whereby setting a specific afterglow time as a characteristic material feature is not a trivial task.

The German patent application publication DE 10 2004 016 249 A1 describes a method for determining the authenticity of objects that is based precisely on the characterization of the decay behavior of a luminescent material.

U.S. Pat. No. 10,900,898B2 describes a method for examining an authenticity feature. Luminescent materials are excited with a modulation signal and the afterglow is tracked with a lock-in amplifier. Since the luminescent materials have a fixed afterglow, the exponential constant can be derived from the phase shift of the afterglow. By using a high modulation frequency, the time required for authenticity determination can be significantly reduced.

In order to make it even more difficult to counterfeit such an authenticity feature, the German disclosure DE 10 2017 130 027 A1 proposes irreproducibly modifying known luminescent materials. The modification takes place by thermal, chemical and/or purely mechanical treatment, whereby a degradation of the luminescent material takes place. As a result of this degradation step, the resulting luminescent material no longer exhibits the typical decay behavior of a first-order exponential process, but can instead be described as a sum of first-order processes. The intensity curve of the afterglow therefore no longer corresponds to a first-order process. In order to determine the authenticity of an object marked with such a luminescent material, high-precision measurement technology is required to precisely characterize the decay behavior and to adequately measure the curve that determines the afterglow as a function of time. Although the high demands placed on the measurement technology give the marking process a high level of counterfeit protection, the widespread use of appropriate testing devices is either not economical or hardly achievable due to the high demands placed on the measurement system. For use with a high throughput of test specimens, the necessary measuring time stands in the way of the high throughput.

For example, banknote processing systems can transport a banknote at a speed of approx. 12 m/s in order to process the sheer number of banknotes in a reasonable amount of time. For an authenticity check in a small area of the banknote, only a few us remain to carry out an authenticity check. In order to numerically characterize a signal curve within a few μs, a shorter decay time in the range of ns is again required in order to statistically specify the afterglow by multiple measurements in the short temporal measurement window. Luminescent materials with such a short decay behavior in the ns range are known. These also exhibit such stable decay behavior as an intrinsic material property that authenticity testing is possible. A spectral measurement of decay processes in the ns range at light intensities with irradiance levels at which banknotes do not fade therefore inevitably results in a single photon measurement. In order to derive a continuous decay behavior from a discrete single photon measurement and to characterize this numerically, a large number of measurements are required in order to be able to carry out the characterization purely statistically. The method is fairly forgery-proof, or at least forgery is not economically feasible. However, the measuring effort required to check authenticity is also quite high, which is an obstacle to the widespread use of this method. Highly accurate, artifact-free and calibrated measuring systems are required for measurement. These are based on equally stable sensors with a high degree of linearity.

It would be desirable to have a method for determining the authenticity of objects that works on the basis of an individual decay behavior for a luminescent material, but which can be operated with simpler measuring systems.

SUMMARY OF THE INVENTION

A task of the invention is therefore to provide a method for determining the authenticity of objects which can be carried out on the basis of standard components which are widely available.

The problem according to the invention may be solved by a method with the features according to one or more embodiments described herein. Further advantageous embodiments of the method are also described herein.

According to the idea of the invention, it is provided that an authenticity feature has at least two different luminescent materials. The object to be marked for authenticity is thus marked with these two luminescent materials. Both up-conversion luminescent materials and down-conversion luminescent materials, as well as a combination of up-conversion luminescent materials and down-conversion luminescent materials, can be used as luminescent materials. It is irrelevant and therefore advantageous whether the marking is carried out with the different luminescent materials at different locations or at the same location. The different luminescent materials have emission bands in different areas of the spectrum. This makes it easy to separate the afterglow signals of the two luminescent materials by using a broadband detector to track the signal of a first luminescent material via a first filter and another detector to track the signal of another luminescent material via another filter. Instead of numerically characterizing the course of the decay behavior, which may no longer be describable by a first-order physical process, the idea of the invention is to form a difference between the signals. If the signal of two signals combined to form a difference signal is based on luminescent materials with a different saturation emission and a different time course, a zero crossing inevitably occurs. A zero crossing can also be easily detected with very short or high-frequency signals. The advantage of difference formation is that it is artifact-free or at least has very few artifacts. This is because both detectors can be set up in such a way that they are subject to the same artifacts. This means that a non-linear detector or a detector, whose linearity is not as good, can be used. Even if simple detectors have sufficient linearity, the high-frequency electronics for tracking the signal in the ns range are susceptible to systemic non-linear imaging of a signal at many points. The artifacts cancel each other out by forming the difference. The actual measured zero crossing of the difference between the two signals depends very much on the actual progression of the afterglow of both signals and less on the signal processing in the electronics. This makes it possible to carry out the authenticity check with widely available means. The difference formation of the signals is used here to detect a signal of the same level between two signal curves at a specific time t. This detection can be carried out by forming the difference between the two signals and determining the zero crossing or by comparing the two signals. From the point of view of the electronics to be used, there is a slight difference between actually subtracting a first signal from a second signal and determining the zero crossing or determining the identical signal level by an identity signal of a comparator. Both techniques, the signal difference circuit and the comparator circuit, are well known in electronics and can be regarded as equivalent to each other when it comes to detecting the zero crossing of a difference signal from two signals or detecting the identical signal level of two signals by means of an identity signal from a comparator.

If an irreversibly modified luminescent material is used, it is not "lost", even if the time of the zero crossing/identity signal is simulated by a combination of other luminescent materials using a counterfeit. It is possible to create a new authenticity feature by using a different combination of two known irreversibly altered luminescent materials. It depends on the combination and the resulting zero crossing/the resulting identity signal. The original luminescent material does not immediately lose its relevance, even if a forgery is successful. It is conceivable that an authenticity check is carried out with two or more than two luminescent materials, number n, whereby n results in more than 2 combinations for one zero crossing/one identity signal. Three luminescent materials result in 3 zero crossings, 4 luminescent materials result in 6 zero crossings and 5 luminescent materials already result in 10 zero crossings. With a manageable number of different luminescent materials, this results in a very difficult to simulate number of zero crossings of different afterglow signals.

In order to make reverse engineering of the luminescent materials used more difficult, it can be advantageously provided that at least one of the luminescent materials used exhibits a decay behavior that can be described by a linear combination of different first-order exponential decay behaviors, according to the following afterglow behavior $$I_t = \sum_{i=0}^{n} I_{0,i} e^{-k_i t}$$

with

I(t) Intensity I at time t i index over a number n of different processes n Number of processes $I_0$ Saturation intensity at time t=0

$k_i$ Decay constant of the process i from n t Time e Basis of the natural logarithm whereby all $k_i$ are different from each other. Here, $I_t$ corresponds to the afterglow intensity after excitation, $I_{0,i}$ corresponds to the saturation intensity or the initial intensity, e corresponds to the base of the natural logarithm, ki corresponds to a constant and t corresponds to the time.

It is possible to work with luminescent materials that strongly overlap in the emission range, although different peaks (emission maxima) exhibit different decay behavior. For optimum separation of the signals, it can be provided that the emission bands of the luminescent materials used overlap as little as possible, whereby an overlap of the emission bands of different luminescent materials of less than 20% is preferred, and an overlap of less than 5% is particularly preferred, based on the area under the respective normalized emission band when the emission band is plotted against the wavenumber ν. The method presented here can be used for luminescent materials with half-live times of the decay behavior in the ms range, in the us range and in the ns range.

The half-life times can be in the range between 1 ms and 1,000 ms, in the range between 1 μs and 1,000 μs or in the range between 1 ns and 1,000 ns.

In addition to the individual measurement of the times for zero crossings, two different methods are available in principle.

A first method comprises exciting the luminescent materials with a sequence of rectangular light pulses, wherein the time interval between two successive light pulses, measured between the half-value time of the descending flank of a preceding light pulse and the half-value time of an ascending flank of a subsequent light pulse, is greater than the time of the zero crossing/identity signal to be expected due to the decay behavior of the luminescent materials used after excitation with the preceding light pulse, whereby the time interval between two successive light pulses is random or pseudo-random. When evaluating the high-frequency signal, the randomly modulated signal helps to smooth out the noise that inevitably accompanies a measurement and thus to make the result statistically more precise. A light pulse for excitation can be a narrow-band light pulse from an ultrashort laser or a light pulse from a light-emitting diode. The spectral bandwidth of the light pulse should be as narrow as possible. The light pulse of a laser is to be understood as monochromatic, whereby a laser also has a physically determined bandwidth, which is almost Gaussian when the light intensity is plotted against the wave number (frequency), i.e. can be described by a Gaussian distribution function, and can have a full width at half maximum (FWHM) of 10 nm down to 2 nm. Deviations result from the Boltzmann distribution and from design-related artifacts of the laser. Light-emitting diodes have a wider bandwidth. Here too, the distribution of the light intensity is roughly Gaussian when plotted against the wave number. With a Gaussian approximation of the actual wavelength distribution with an RMS error of less than 5%, the bandwidth of a light-emitting diode is between 10 nm FWHM of the approximate Gaussian function and 50 nm FWHM of the approximate Gaussian function. The wavelengths of 640 nm (red), 530 nm (green)

460 nm to 480 nm (blue) in the visual range and 940 m and 980 nm, the latter two in the NIR range, are suitable as special excitation wavelengths when using light-emitting diodes or laser diodes. These wavelengths originate from known light emitting diodes/laser diodes, which have a particular long-term stability. For excitation, it is possible to use a narrow-band light pulse at a central wavelength of the light pulse with a previously mentioned bandwidth as well as a combination of at least two or more narrow-band light pulses, each with a previously mentioned bandwidth.

A second method involves exciting the luminescent materials with a regular sinusoidal excitation signal whose lower vertex of the sinusoidal waveform is approximately zero, and determining the phase offset between the upper vertex of the excitation signal and the zero crossing of the difference signal or identity signal. Such measurement techniques can be carried out with lock-in amplifiers, whereby the phase offset in conjunction with the frequency of the lock-in amplifier indicates the zero crossing or the identity signal.

BRIEF DESCRIPTION OF THE DRAWINGS

The invention is explained in more detail with reference to the following figures. It shows.

DETAILED DESCRIPTION OF THE PREFERRED EMBODIMENTS

Figure 1:
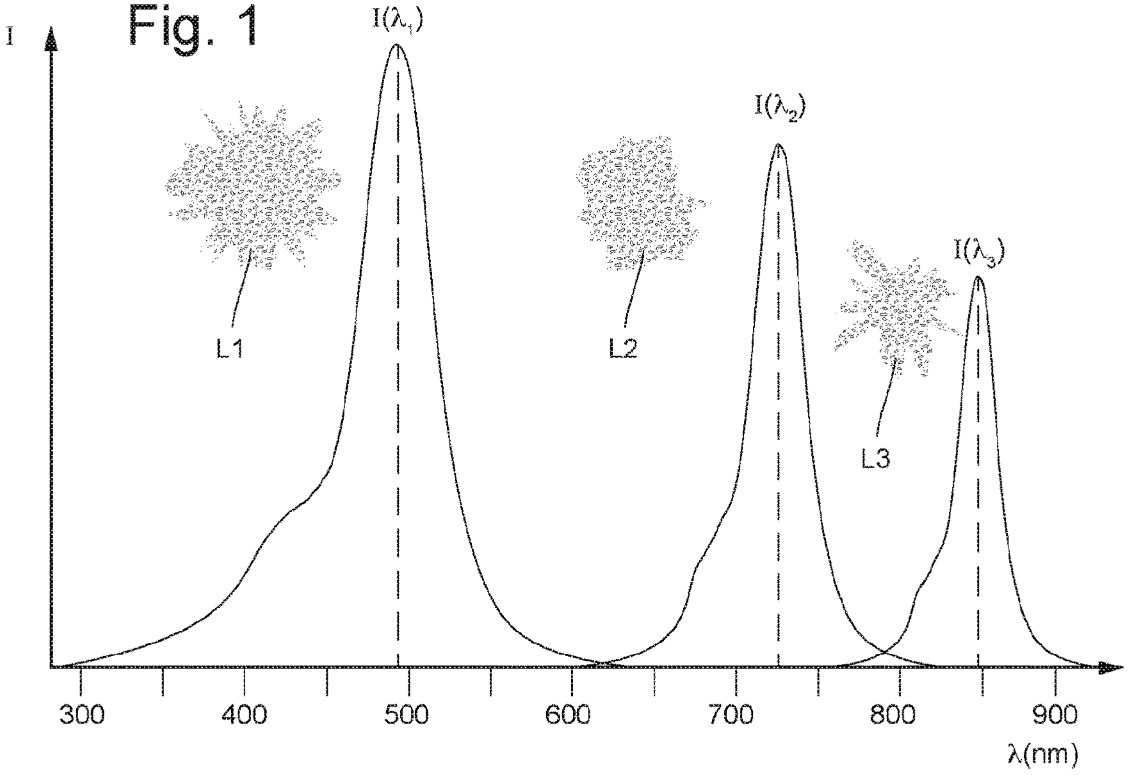
FIG. 1 Emission spectra of three exemplary luminescent materials with a narrow emission band, FIG. 2 a signal diagram to illustrate the signal formation from the different decay behavior of the luminescent materials used, FIG. 3 a signal diagram to illustrate the random modulation, FIG. 4 a signal diagram to illustrate the sine wave modulation, FIG. 5 a signal diagram illustrating the difference in the decay behavior of a first-order process and a luminescent material that has undergone irreversible degradation, FIG. 6 a first exemplary object with a marking according to the idea of the invention, FIG. 7 a second exemplary object with a marking according to the idea of the invention, FIG. 8 a third exemplary object with a marking according to the idea of the invention, and, FIG. 9 a fourth exemplary object with a marking according to the idea of the invention.

FIG. 1 shows three emission spectra of three exemplary luminescent materials L1, L2 and L3, each with a narrow emission band $I(\lambda_1)$, $I(\lambda_2)$ and $I(\lambda_3)$. These luminescent materials can either be up-conversion luminescent materials, which can be excited in the IR range up to the VIS range and which show an emission in the VIS range up to the UV range after excitation. Up-conversion luminescent materials generally have a low conversion rate in the range of 1 to 5% due to the up-conversion from lower excitation energy to higher emission energy per photon. However, this conversion rate is sufficient to carry out an authenticity check. For optimal signal separation and to avoid a cascade of excitation, emission, and subsequent excitation of another luminescent material by the emission of the original luminescent material, it can be provided that the emission bands overlap as little as possible. The overlap can best be defined by plotting the emission band over the wavenumber ν as plotting over the wavelength results in a distortion and overestimation of the long-wave components in relation to the energy distribution of the emitted photons. In the example shown here, the overlap of the emission bands is less than 20% in relation to the normalized emission bands. According to the invention, particularly preferably 5% in relation to the normalized emission bands.

Figure 2:
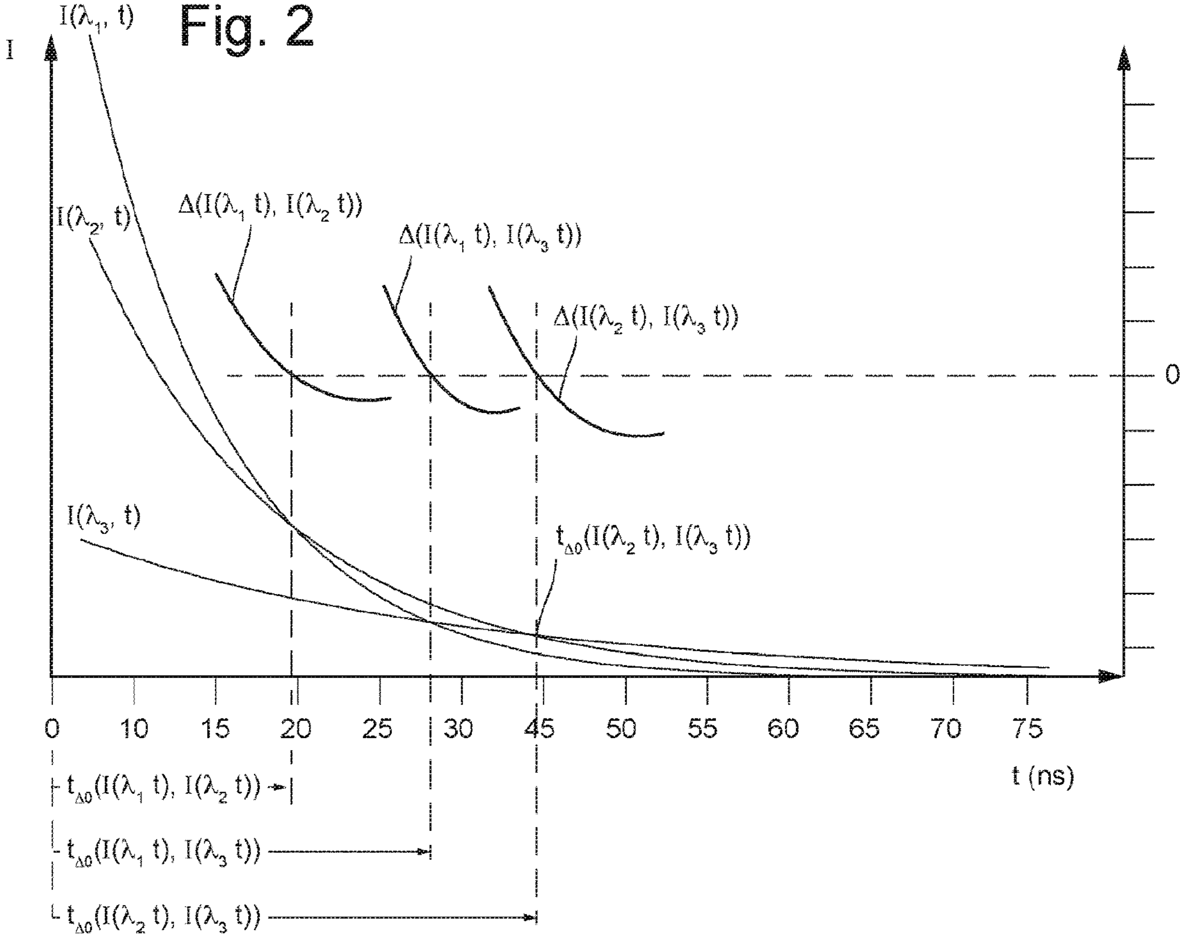

FIG. 2 shows a signal diagram to illustrate the signal formation from the different decay behavior of the luminescent materials L1, L2 and L3 used. The left-hand abscissa shows the intensity I of the afterglow. The first luminescent material L1 has a natural decay behavior according to a first-order process, whereby the decay behavior is shown by the curve for the afterglow intensity I(λ1,t). This curve is based on the highest saturation intensity $I_0$ at t=0, where the half-life time for the decay curve is the shortest. The second luminescent material L2 has a natural decay behavior according to a first order process, where the decay behavior is shown by the curve for the afterglow intensity I(λ2,t). This curve is based on an average saturation intensity $I_0$ at t=0, whereby the half-life time for the decay curve is in the mid-range here. Finally, the third luminescent material L3 also has a natural decay behavior according to a first-order process which is shown by the curve for the afterglow intensity I(λ3,t). This third curve is based on the lowest saturation intensity $I_0$ at t=0, whereby the half-life time for the decay curve is the longest here.

The diagram generated here shows luminescent materials with short afterglow times in the ns range. At approximately t=19 ns, the curves of the afterglow intensity I(λ1,t) and I(λ2,t) meet. From these two curves a difference signal A (I(λ1,t),I(λ2,t)) can be derived. The right-hand abscissa shows this difference value. The first difference signal A (I(λ1,t), I(λ2,t)) from the two afterglow intensities I(λ1,t) and I(λ2,t) has a zero crossing at an identical point, namely at t=19 ns, which can be easily determined electronically. Analogous to the formation of the difference signal A (I(λ1,t), I(λ2,t)), two further difference signals A (I(λ1,t), I(λ3,t)) and A (I(λ2,t), I(λ3,t)) can be formed from the curves of the afterglow intensities I(λ1,t) and I(λ3,t) and from the curves of the afterglow intensities I(λ2,t) and I(λ3,t). With the three different luminescent materials L1, L2 and L3, three zero crossings of signals can therefore be formed, which are fixed and unchangeable as physical or intrinsic material constants and which can be easily determined by simple means, even at high frequency, because artifacts are canceled out during the measurement.

Figure 3:
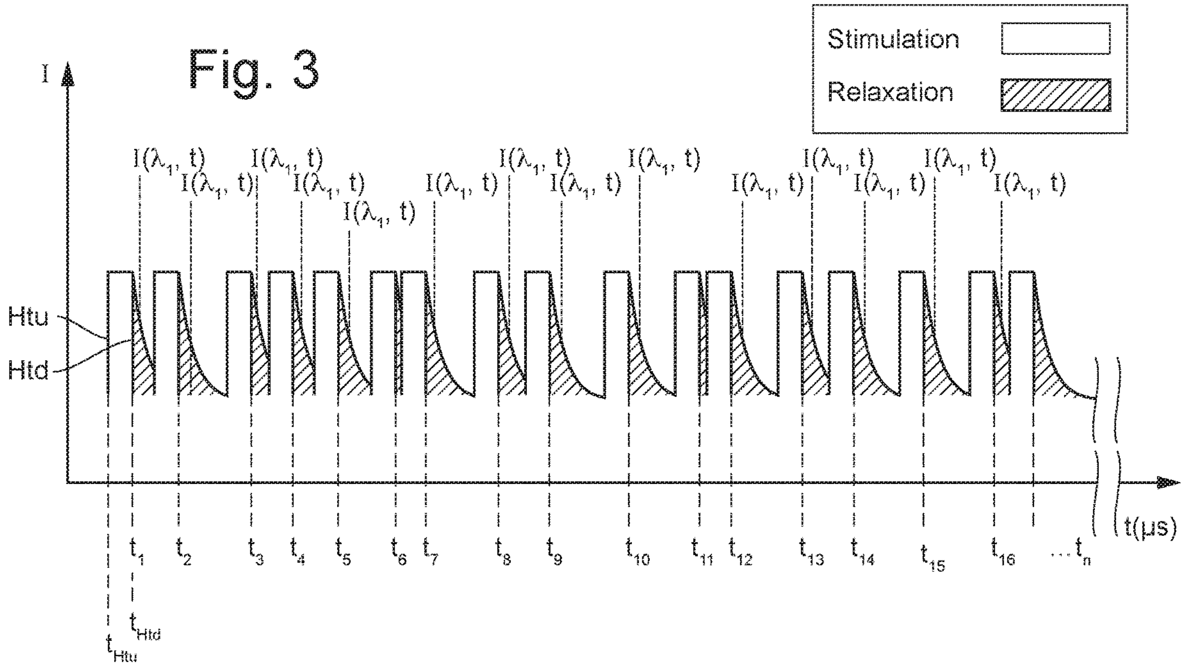

FIG. 3 shows a signal diagram to illustrate the random modulation. In this diagram, the excitations are shown as randomly modulated rectangular signals with a white background. The excitation duration is always the same length and the excitation pulses highlighted in white have the same width. However, the time interval between a half-value time Htd of a descending flank of the white-background excitation pulses and a half-value time Htu of a subsequent ascending flank of a white-background excitation pulse varies randomly or at least pseudo-randomly. The times of the ascending flanks of the excitation pulses at t= (t1, t2, . . . tn) are therefore randomly selected. In each case, an excitation signal is followed by a signal of the relaxation of the respective luminescent material with a afterglow intensity I(λ1,t). This modulated random signal can be read out by an electronic evaluation unit. Only the relaxation of a first luminescent material is shown in this diagram. An almost identical signal diagram would result for the relaxation of a second luminescent material, although the relaxation times are different. Only a difference signal from I(λ1,t) and I(λ2,t) results in the difference signal A (I(λ1,t),I(λ2,t)) in which the zero crossing can be reliably determined.

Figure 4:
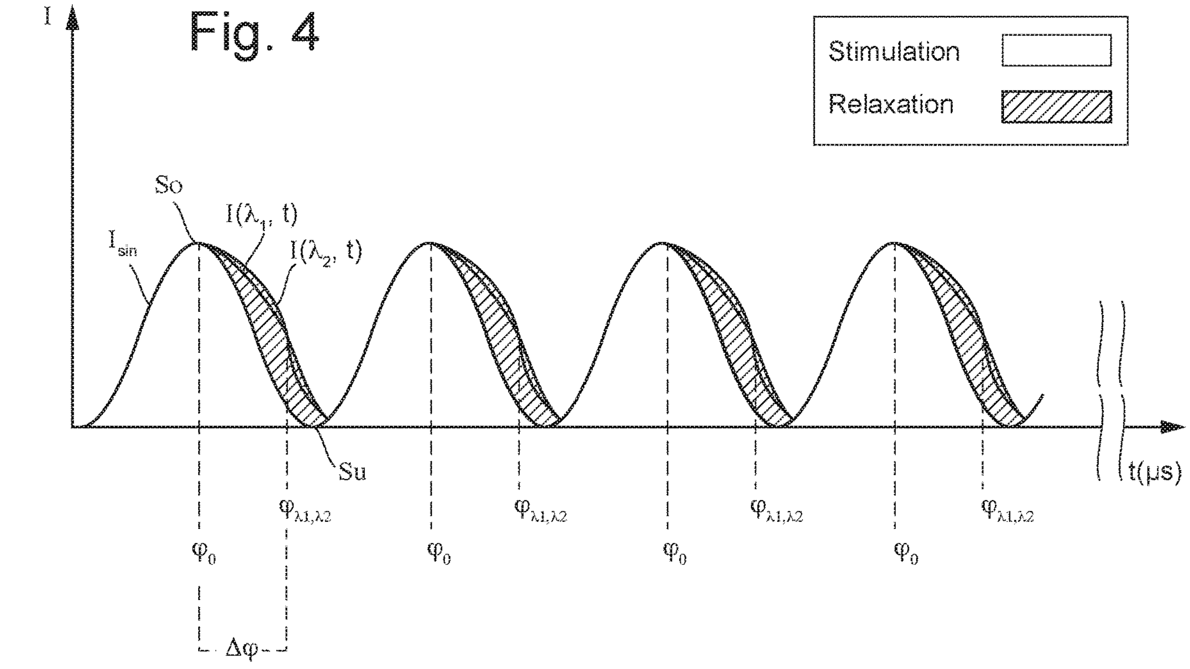

FIG. 4 shows a signal diagram to illustrate sinusoidal modulation. In sine modulation, excitation does not take place by means of square-wave pulses, whereby excitation and relaxation are strictly separated from each other, but in sine modulation the excitation signal is modulated sinusoidally, whereby the lower vertex Su of sine modulation is approximately at zero. Relaxation of the luminescent material already takes place during excitation. A phase shift can be detected during this modulation, for example by a lock-in amplifier. The phase offset cannot be defined here as with the phase offset of two sinusoidal signals, which have a fixed, temporal relationship between their zero crossings. Rather, a phase shift $\Delta\varphi$ can be described by the distance between the upper vertex So and the zero crossing by the difference formation of two relaxation signals of two different luminescent materials, in which the difference $\varphi_{\lambda 1,\lambda 2}$ is formed from the afterglow intensity I(λ1,t) for a first luminescent material L1 and from the afterglow intensity I(λ2,t) for a second luminescent material L2. The distance between the time t for $\varphi_0$ and the time for $\varphi_{\lambda 1,\lambda 2}=0$ can be used as the characteristic phase offset because the time of the upper vertex So can be easily determined by a zero crossing of a differential signal, in this case a cosine signal. A differential signal can be achieved by a resonant coil or capacitor circuit. The reference to the differential signal So and the zero crossing makes it possible to ignore the inflection point of the excitation signal superimposed by the emission.

Figure 5:
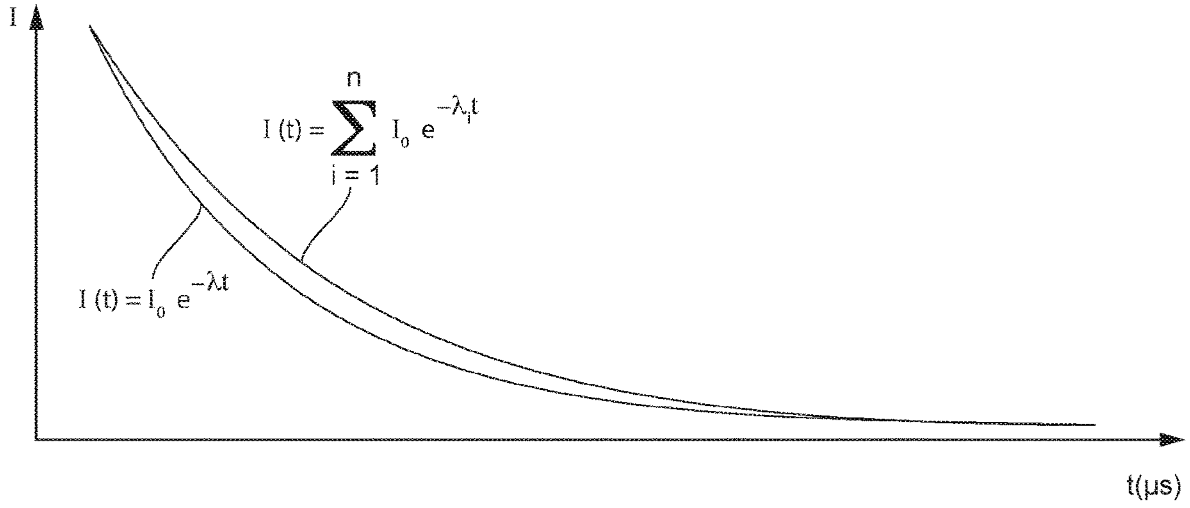

FIG. 5 shows a signal diagram to illustrate the difference in the decay behavior of a first-order process and a luminescent material, whereby the latter has undergone irreversible degradation.

The signal of the first luminescent material, which obeys a first-order process, is described by an afterglow function according to $$I(t) = I_0 e^{-kt}$$

with

I(t) Intensity I at time t $I_0$ Saturation intensity at time t=0 k decay constant t Time e Basis of the natural logarithm

The signal of the second luminescent material, which does not obey a first-order process due to degradation, is described by a function for the afterglow according to $$I(t) = \sum_{i=1}^{n} I_0 e^{k_i t}$$

with

I(t) Intensity I at time t i index over a number n of different processes n Number of processes $I_0$ Saturation intensity at time t=0

$k_i$ Decay constant of the process i from n t Time e Basis of the natural logarithm where there is a sum of first-order processes. Depending on the type of degradation, however, the saturation intensity can also vary according to $$I(t) = \sum_{i=1}^{n} I_{0,i} e^{k_i t}$$

with

I(t) Intensity/at time t i Index over a number n of different processes n Number of processes $I_{0,i}$ Saturation intensity of the process i from n at time t=0

$k_i$ Decay constant of the process i from n t Time

The signal curve of the sum of first-order processes can no longer be described by a decaying e-function. In order to measure the exact course of the curve, the measurement lacks a clear regularity. Consequently, the sum curve cannot be determined by regression calculation of the results from a large number of individual measurements. The requirement for measurement accuracy to characterize the cumulative curve is therefore very high, as statistical methods for determining the curve and smoothing it may be lacking. The method according to the invention reduces the measurement effort to the temporal determination of zero crossings, whereby the zero crossings are generated by forming the difference between two signals from the luminescent materials themselves.

Figure 6:
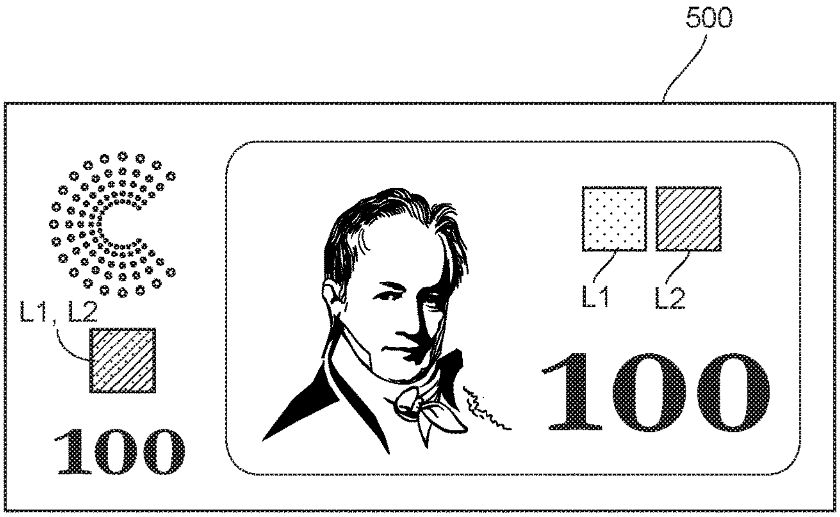

FIG. 6 shows a use of the security feature by marking with at least two luminescent substances with different decay behavior on an exemplary banknote 500. The security feature 100 is arranged where a classic watermark is arranged on many banknotes 500, which is visible against the light from both sides of the banknote 500.

Figure 7:
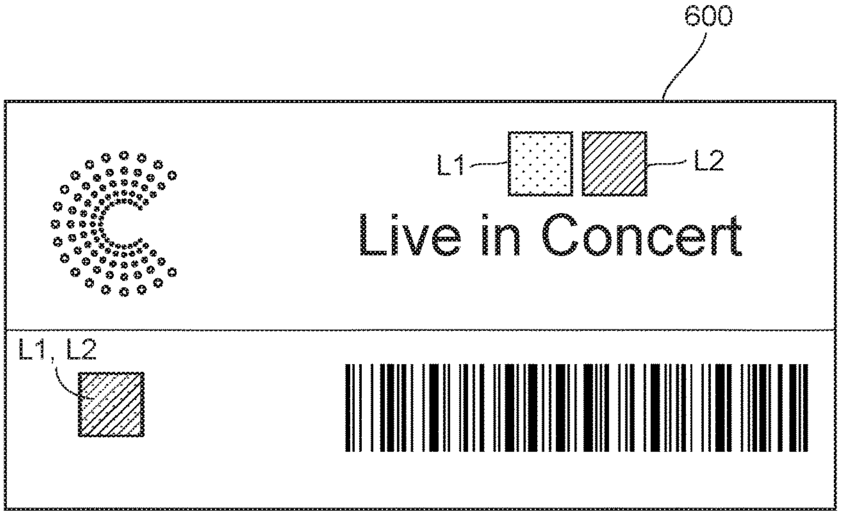

FIG. 7 shows the use of by marking with at least two luminescent materials with different decay behavior on an exemplary concert ticket 600. The marking is arranged where a hologram is arranged as a security feature on many concert tickets 600, which is visible on one side.

Figure 8:
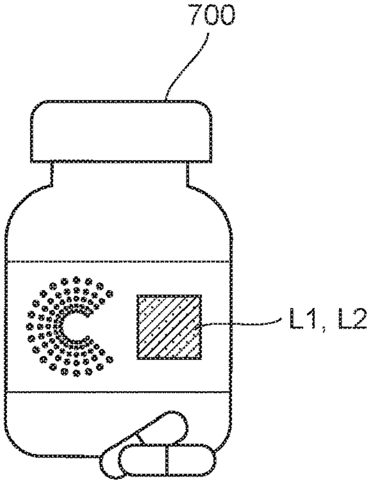

FIG. 8 shows a use of the security feature by marking with at least two fluorescent substances with different decay behavior on an exemplary medicine can. Since many medicine cans are colored but clear, the marking can be seen either only to the front or only through the medicine can.

Figure 9:
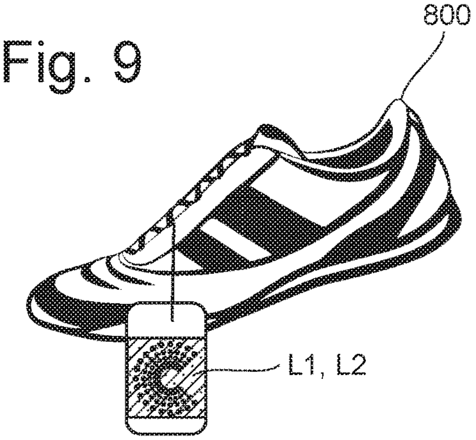

Finally, FIG. 9 shows the use of the security feature by marking with at least two luminescent substances with different decay behavior on an exemplary label for a product, in this case a label for a modern shoe. Instead of the shoe, high-priced goods such as jewelry or watches can also be considered. However, high-priced foodstuffs can also be marked on a label with a safety feature according to the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST

500 Object
600 Object
700 Object
800 Object
Δ(I(λ1,t),I(λ2,t)) Difference signal
Δ(I(λ1,t),I(λ3,t)) Difference signal
Δ(I(λ2,t),I(λ3,t)) Difference signal
e Basis of the natural logarithm
I(λ1,t) Afterglow intensity
I(λ1,t) Afterglow intensity
I(λ1) Emission band
I(λ2) Emission band
I(λ3) Emission band
$I_0$ Saturation intensity
$I_{sin}$ Excitation signal
k decay constant
$k_i$ Decay constant of the process i from n
λ Wavelength
n Number of processes
L1 Luminescent material
L2 Luminescent material
L3 Luminescent material
ν Wave number
Su lower vertex
So upper vertex
t Time
$t_{\Delta 0}$ (I(λ1,t), I(λ2, t)) Time of zero crossing
$t_{Hrd}$ half-life point of the descending flank
$t_{Hru}$ half-life point of the ascending flank

The invention claimed is:

1. A method for determining an authenticity of an object, comprising the following steps:
- marking the object with a first luminescent material with a first decay behavior over time,
- marking the object with a second luminescent material with a second decay behavior that differs from the first decay behavior,
- exciting the first and second luminescent materials with a light pulse,
- measuring an afterglow intensity of both the first and second luminescent materials after the exciting with the light pulse,
- forming a difference signal or identity signal from the afterglow intensities, measured over an elapsed time,
- determining a time of a zero crossing of the difference signal or a time of the identity signal of a comparator, and,
- comparing the time determined by the zero crossing or by the identity signal with a setpoint value.

2. The method according to claim 1, further comprising:
- marking the object with at least one third luminescent material with a third decay behavior that differs from the first and second decay behaviors.

3. The method according to claim 1, wherein at least one luminescent material comprises a decay behavior corresponding to a linear combination of different first-order exponential decay behaviors according to $$I_t = \sum_{i=0}^{n} I_{0,i} e^{-k_i t}$$

wherein
- $I_t$ represents afterglow intensity after stimulation,
- $I_{0,i}$ represents a saturation intensity or an initial intensity of process i out of n processes,
- $k_i$ represents decay constant of the process i from n processes,
- n represents a number of processes, and,
- t represents time.

4. The method according to claim 1, wherein an overlap of emission bands of different luminescent materials of less than 20%, relative to an area under a respective normalized emission band when the emission band is plotted against a wave number.

5. The method according to claim 1, wherein the exciting the first and second luminescent materials with a light pulse comprises:
- exciting the first and second luminescent materials with a sequence of rectangular light pulses,
- wherein a time interval between two successive light pulses, measured between a half-value time of a descending flank of a preceding light pulse and a half-value time of an ascending flank of a subsequent light pulse, is greater than a time of the zero crossing or the identity signal to be expected due to the first and second decay behaviors of the first and second luminescent materials used after excitation with the preceding light pulse, and
- wherein the time interval between two successive light pulses is random or pseudo-random.

6. The method according to claim 1, wherein the exciting the first and second luminescent materials with a light pulse comprises:
- exciting the first and second luminescent materials with a regular, sinusoidal excitation signal, wherein a lower vertex of the regular, sinusoidal excitation signal is approximately zero, and wherein the method further comprises:
- determining a phase offset between an upper vertex of the regular, sinusoidal excitation signal and the zero crossing of the difference signal or the identity signal of a comparator.

7. The method according to claim 1, wherein the first and second luminescent materials each comprises a half-life time between 1 ms and 1,000 ms after excitation with a light pulse.

8. The method according to claim 1, wherein the first and second luminescent materials each comprises a half-life time between 1 μs and 1,000 μs after excitation with a light pulse.

9. The method according to claim 1, wherein the first and second luminescent materials each comprises a half-life time between 1 ns and 1,000 ns after excitation with a light pulse.

10. The method according to claim 1, wherein the first and second luminescent materials each comprises a saturation intensity, wherein the saturation intensity of the first luminescent material is different from the saturation intensity of the second luminescent material.

11. The method according to claim 1, wherein at least one of the first and second luminescent materials comprises an up-conversion luminescent material.

12. The method according to claim 1, wherein at least one of the first and second luminescent materials comprises a down conversion luminescent material.

* * * * *